(12) United States Patent
Qian et al.

(10) Patent No.: US 11,938,545 B2
(45) Date of Patent: Mar. 26, 2024

(54) ULTRALIGHT CONDUCTIVE METALLIC AEROGELS

(71) Applicant: Lawrence Livermore National Security, LLC, Livermore, CA (US)

(72) Inventors: Fang Qian, Santa Cruz, CA (US); Thomas Han, Livermore, CA (US); Marcus Worsley, Hayward, CA (US)

(73) Assignee: LAWRENCE LIVERMORE NATIONAL SECURITY, LLC, Livermore, CA (US)

(*) Notice: Subject to any disclaimer, the term of this patent is extended or adjusted under 35 U.S.C. 154(b) by 459 days.

(21) Appl. No.: 16/616,260

(22) PCT Filed: Jun. 22, 2018

(86) PCT No.: PCT/US2018/039115
§ 371 (c)(1),
(2) Date: Nov. 22, 2019

(87) PCT Pub. No.: WO2018/237337
PCT Pub. Date: Dec. 27, 2018

(65) Prior Publication Data
US 2020/0157657 A1 May 21, 2020

Related U.S. Application Data

(60) Provisional application No. 62/524,344, filed on Jun. 23, 2017.

(51) Int. Cl.
*B22F 9/24* (2006.01)
*B22F 1/054* (2022.01)
(Continued)

(52) U.S. Cl.
CPC .............. *B22F 9/24* (2013.01); *B22F 1/0547* (2022.01); *C22C 1/08* (2013.01); *H01B 5/00* (2013.01);
(Continued)

(58) Field of Classification Search
None
See application file for complete search history.

(56) References Cited

U.S. PATENT DOCUMENTS 9,208,919 B2 * 12/2015 Kong ..................... H01B 1/16
2009/0226700 A1   9/2009 Ratke et al.
(Continued)

FOREIGN PATENT DOCUMENTS

CN   106001542     * 10/2016
WO   2016127084 A1   8/2016
WO   2017095925 A1   6/2017

OTHER PUBLICATIONS

Tang et al., "Ultralow-density copper nanowire aerogel monoliths with tunable mechanical and electrical properties", Apr. 26, 2013, J. Mater. Chem. A, 2013, vol. 1, pp. 6723-6726. (Year: 2013).*
(Continued)

*Primary Examiner* — Xiaobei Wang
(74) *Attorney, Agent, or Firm* — Zilka-Kotab, P.C.

(57) ABSTRACT

In accordance with one aspect of the presently disclosed inventive concepts, a metal aerogel includes a plurality of metal nanowires formed into a porous three-dimensional structure, where pores in the structure are anisotropic.

24 Claims, 11 Drawing Sheets

(51) Int. Cl.
*C22C 1/08* (2006.01)
*H01B 5/00* (2006.01)

(52) U.S. Cl.
CPC . *B22F 2301/255* (2013.01); *Y10T 428/12153* (2015.01)

(56) References Cited

U.S. PATENT DOCUMENTS

| | | | |
|---|---|---|---|
| 2012/0052511 A1* | 3/2012 | Worsley | B01J 13/0091 435/7.1 |
| 2015/0129813 A1 | 5/2015 | Peng et al. | |
| 2016/0101398 A1* | 4/2016 | Worsley | C01B 32/23 106/122 |

OTHER PUBLICATIONS

Chen et al., "Flaw tolerance vs. performance: A tradeoff in metallic glass cellular structures," Acta Materialia, vol. 73, May 2014, pp. 259-274.
Estevez et al., "Multifunctional Graphene/Platinum/Nafion Hybrids via Ice Templating," Journal of the American Chemical Society, vol. 133, 2011, pp. 6122-6125.
Wu et al., "Three-Dimensional Highly Conductive Graphene?Silver Nanowire Hybrid Foams for Flexible and Stretchable Conductors," Applied Materials and Interfaces, vol. 6, Nov. 2014, pp. 21026-21034.
Tang et al.,"Manufacturable Conducting Rubber Ambers and stretchable Conductors from Copper Nanowire Aerogel Monoliths,"ACS NANO, vol. 8, No. 6, May 29, 2014, pp. 5707-5714
Zhu et al., "Engineering Ordered and Nonordered Porous Noble Metal Nanostructures: Synthesis, Assembly, and Their Applications in Electrochemistry," Chemical Review, 2015, pp. 8896-8943.
Davis, M., "Ordered porous materials for emerging applications," Nature, vol. 417, Jun. 20, 2002, pp. 813-821.
Tappan et al., "Ultralow-Density Nanostructured Metal Foams: Combustion Synthesis, Morphology, and Composition," Journal of the American Chemical Society, No. 128, No. 20, 2006, pp. 6589-6594.
Biener et al., "Nanoporous Gold: Understanding the Origin of the Reactivity of a 21st Century Catalyst Made by Pre-Columbian Technology," ACS Catalysis, vol. 5, 2015, pp. 6263-6270.
Chen et al., "Versatile Fabrication of Ultralight Magnetic Foams and Application for Oil Water Separation," ACS Nano, vol. 07, No. 08, 2013, pp. 6875-6883.
He et al., "Polypyrrole/Silver Coaxial Nanowire Aero-Sponges for Temperature-Independent Stress Sensing and Stress-Triggered Joule Heating," ACS Nano, vol. 09, No. 04, 2015, pp. 4244-4251.
Zhi et al., "Highly Conductive Ordered Mesoporous Carbon Based Electrodes Decorated by 3D Graphene and 1D Silver Nanowire for Flexible Supercapacitor," Advanced Functional Materials, vol. 24, 2013, pp. 2013-2019.
Hu et al., "Enhanced Electrocatalysis via 3D Graphene Aerogel Engineered with a Silver Nanowire Network for Ultrahigh-Rate Zinc-Air Batteries," Advanced Science News, vol. 1700041, 2017, pp. 1-11.
Korte et al., "Rapid synthesis of silver nanowires through a CuCl or CuCl2-mediated polyol process," The Royal Society of Chemistry, vol. 18, 2008, pp. 437-441.
Sun et al., "Polyol Synthesis of Uniform Silver Nanowires: A Plausible Growth Mechanism and the Supporting Evidence," Nano Letters, vol. 03, No. 07, 2003, pp. 955-960.
Li et al., "Synthesis and Purification of Silver Nanowires to Make Conducting Films with a Transmittance of 99%," Nano Letters, vol. 15, 2015, pp. 6722-6726.
Sun et al., "A fluorescent perylene-assembled polyvinylpyrrolidone film: synthesis, morphology and nanostructure," Soft Matter, Royal Society of Chemistry, vol. 10, 2014, pp. 3426-3431.
Mutiso et al., "Electrical percolation in quasi-two-dimensional metal nanowire networks for transparent conductors," American Physical Society, Physical Review E 88, 2013, pp. 032134-1-032134-8.
International Preliminary Examination Report from PCT Application No. PCT/US2018/039115, dated Dec. 24, 2019.
Qian et al., "Ultralight Conductive Silver Nanowire Aerogels," Nano Letters, Sep. 5, 2017, 6 pages.
Sherrell et al., "Mesoscale design of multifunctional 3D graphene networks," Materials Today, vol. 19, No. 8, Oct. 2016, pp. 428-436.
Liu et al., "Noble Metal Aerogels-Synthesis, Characterization, and Application as Electrocatalysts," Accounts of Chemical Research, vol. 48, Jan. 22, 2015, pp. 154-162.
Kim et al., "A review on manufacturing and application of open-cell metal foam," Procedia Materials Science, vol. 4, 2014, pp. 305-309.
Schaedler et al., "Ultralight Metallic Microlattices," Science, vol. 334, Nov. 18, 2011, pp. 962-965.
Jiang et al., "Ultralight metal foams," Scientific Reports, vol. 5:13825, Sep. 8, 2015, pp. 1-8.
Jung et al., "A facile route for 3D aerogels from nanostructured 1D and 2D materials," Scientific Reports, vol. 2:849, Nov. 14, 2012, pp. 1-5.
Zhu et al., "Three-dimensional highly conductive silver nanowires sponges based on cotton-templated porous structures for stretchable conductors," Royal Society of Chemistry, RSC Advances, vol. 7, 2017, pp. 51-57.
Ge et al., "Stretchable Conductors Based on Silver Nanowires: Improved Performance through a Binary Network Design," Angewandte Chemie International Edition, vol. 52, 2013, pp. 1654-1659.
Cheng et al., "Temperature Dependence of Electrical and Thermal Conduction in Single Silver Nanowire," Scientific Reports, vol. 5:10718, Jun. 2, 2015, pp. 1-12.
Garnett et al., "Self-limited plasmonic welding of silver nanowire junctions," Nature Materials, vol. 11, No. 3, Feb. 5, 2012, pp. 1-9, retrieved from https://www.researchgate.net/publication/221807336_Self-limited_plasmonic_welding_of_silver_nanowire_junctions.
Ma et al., "Eddy current measurements of electrical conductivity and magnetic permeability of porous metals," NDT&E International, vol. 39, 2006, pp. 562-568.
Zheng et al., "Ultralight, Ultrastiff Mechanical Metamaterials," Science, vol. 344, Issue. 6190, Jun. 20, 2014, pp. 1373-1377.
Gibson, L.J., "Cellular Solids," MRS Bulletin, vol. 28, Issue. 4, Apr. 2003, pp. 270-274, retrieved from https://www.cambridge.org/core/journals/mrs-bulletin/article/cellular-solids/D75AD0A311E503438FAC908AA45550B4.
Biener et al., "Nanoporous Plasmonic Metamaterials," Advanced Materials, vol. 20, 2008, pp. 1211-1217.
Tang et al., "Ultralow-density copper nanowire aerogel monoliths with tunable mechanical and electrical properties," Journal of Materials Chemistry A, vol. 1, pp. 6723-6726, Year: 2013.
Jung et al., "Porous Cu Nanowire Aerosponges from One-Step Assembly and their Applications in Heat Dissipation," Advanced Materials, vol. 28, 2016, pp. 1413-1419.
International Search Report and Written Opinion from PCT Application No. PCT/US18/39115, dated Oct. 30, 2018.

\* cited by examiner

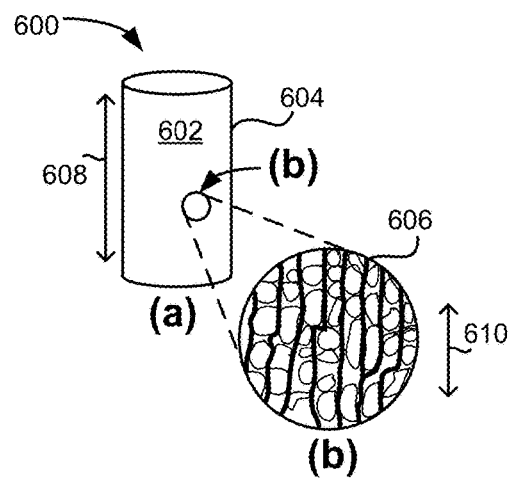
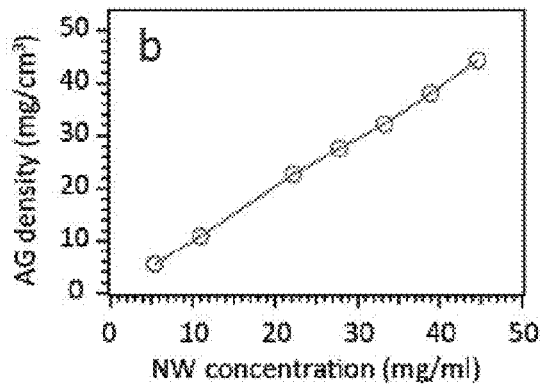
FIG. 6A  FIG. 6B
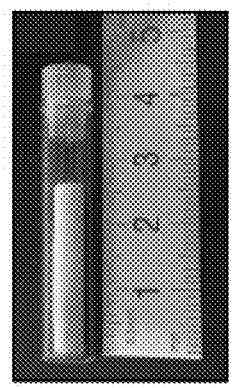
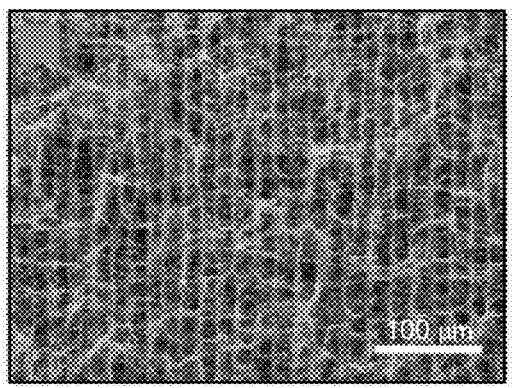
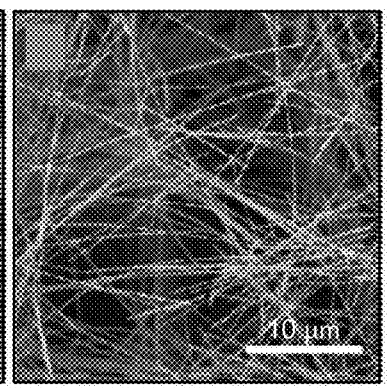
FIG. 6C  FIG. 6D  FIG. 6E
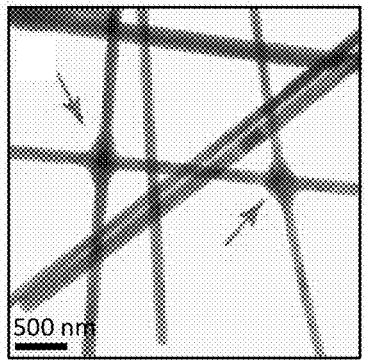
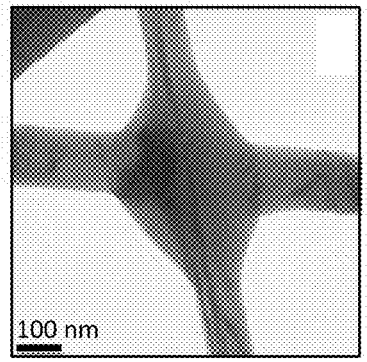
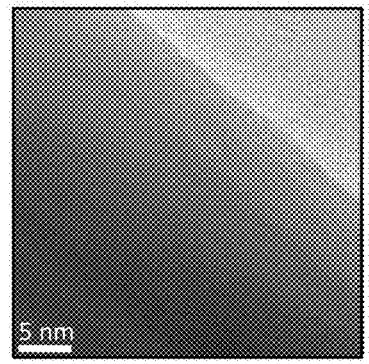
FIG. 6F  FIG. 6G  FIG. 6H

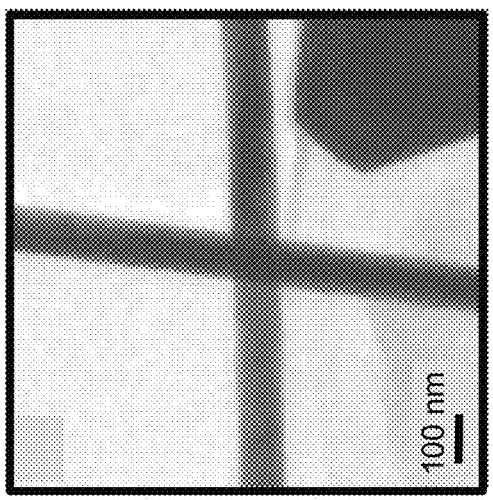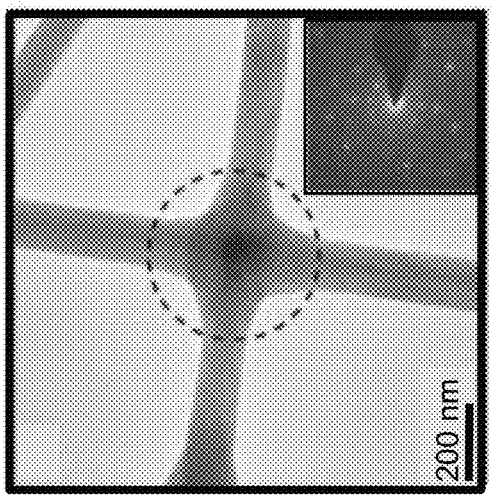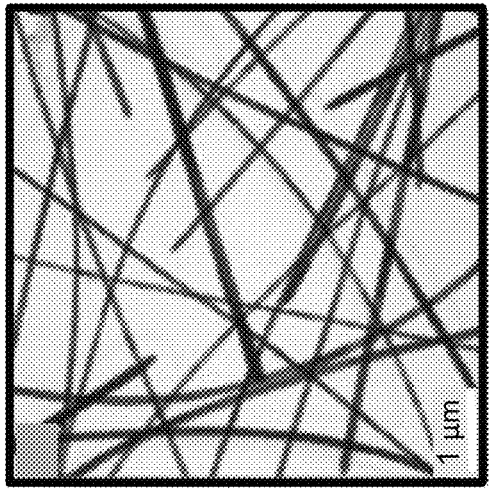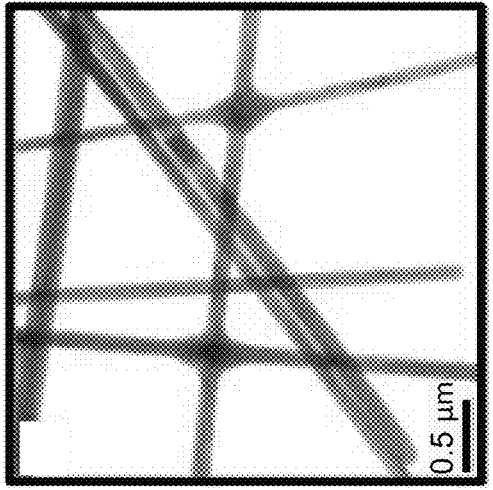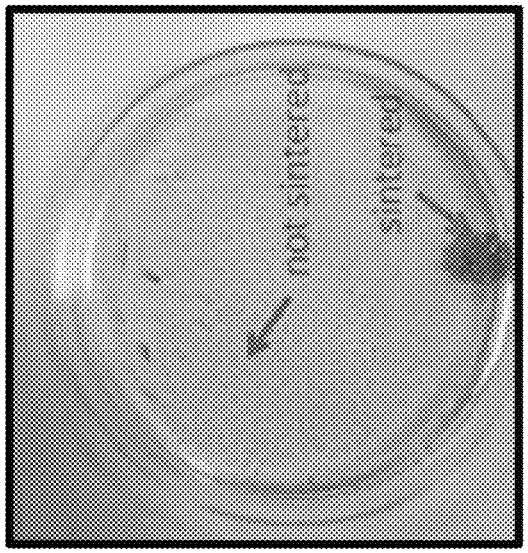

ULTRALIGHT CONDUCTIVE METALLIC AEROGELS

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to metallic aerogels, and more particularly, this invention relates to ultralight conductive metallic aerogels comprising a metal such as silver, gold, copper and/or nickel.

BACKGROUND

Metal foams (or porous metals) represent a new class of materials with unique combinations of properties of light weight, high surface area, high electrical conductivity and low thermal conductivity, and could potentially enable various new applications in electronics, thermal insulation, sensing, catalysis and energy storage. Conventional methods for producing metal foams include powder metallurgical process, combustion methods, de-alloying, or plating of metal films on existing porous templates. These methods are challenging because they demand critical manufacturing conditions (e.g. high temperature, high pressure, and/or strict oxygen exclusion), are expensive, or are not scalable for practical device applications. It would be desirable to develop methods to produce metal forms that do not require critical manufacturing conditions, are affordable, and are scalable for practical use.

Recent advances in metal nanowire (NW) synthesis enable new methodologies of metal foam production under mild conditions, can be scaled up and offer flexible materials choices. Using an aqueous suspension of copper (Cu) NWs, light porous monoliths of copper NW aerogels can be formed by random freezing methods, e.g. freeze-drying or critical point drying. In addition, alternative methods for forming CuNW aerogels involve producing a CuNW aerosponge through the gelation of a concentrated CuNW suspension followed by critical point drying. However, these methods involve formation by settling of the NWs to a pellet thereby forming a loosely percolated structure in the form of a gel. Thus, not only does the resulting structure lack a substantially uniform structure of nanowires in the aerogel, but the random freezing method of the gel may also adversely affect percolation efficiency of the aerogel.

However, in both methodologies, the resulting CuNW aerogels show initial electrical conductivity, but the high surface area of the structure renders the CuNW aerogel susceptible to surface oxidation within a few hours of fabrication. The resulting Cu oxide on the surface of the aerogel is not electrically conductive so the aerogel becomes more resistive over time, and thus, the CuNW aerogel is not stable.

Thus, it would be desirable to produce silver nanowire (AgNWs) aerogels, because Ag oxide which may form on the surface of AgNW aerogels is conductive, so the electrical conductivity of an AgNW aerogel would remain stable. Conventional methods to form AgNWs involve dip-coating a macroporous foreign template into AgNW suspension, so that the template becomes conductive due to the surface coating of AgNWs. Numerous template materials, including cotton, polymer, carbon, and graphene may be available to generate lightweight and conductive foams. However, organic contamination can be deleterious to the AgNW, and thus, the binary composition of these foams with a AgNW coating may limit their application.

Therefore, it would be desirable to fabricate uniform AgNW aerogels that are essentially free of other materials in the final structure.

SUMMARY

In accordance with one aspect of the presently disclosed inventive concepts, a metal aerogel includes a plurality of metal nanowires formed into a porous three-dimensional structure, where pores in the structure are anisotropic.

In accordance with another aspect of the presently disclosed inventive concepts, a method of forming an aerogel of metal nanowires includes suspending a plurality of purified metal nanowires having a polymer coating in an aqueous solution thereby creating a suspension, freeze casting the suspension, lyophilizing the frozen suspension to a dry structure of metal nanowires, and sintering the lyophilized structure of metal nanowires.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 6A is a schematic drawing of a metal aerogel, according to inventive concepts described herein.

FIG. 6B is plot of measured aerogel density vs. estimated NW concentration, according to one inventive concept.

FIG. 6C is a digital photograph of an aerogel cylinder in a vial, according to one inventive concept.

FIG. 6D is a SEM image of aerogel microstructures, according to one inventive concept. Scale bar is 100 μm.

FIG. 6E is a high magnification SEM image of aerogel microstructures, according to one inventive concept. Scale bar is 10 μm.

FIG. 6F is a low resolution TEM image of welded NW junctions, according to one inventive concept. Scale bar is 500 nm.

FIG. 6G is a low resolution TEM image of welded NW junctions, according to one inventive concept. Scale bar is 100 nm.

FIG. 6H is a high resolution TEM image of NW surface. Scale bar is 5 nm.

FIG. 8A is a digital photograph of sintered aerogels and not sintered aerogels suspended in water in a petri dish.

FIG. 8B is a low-resolution TEM image of an unsintered aerogel, according to one inventive concept.

FIG. 8C is a high-resolution TEM image of an unsintered aerogel, according to one inventive concept.

FIG. 8D is a low-resolution TEM image of a sintered aerogel, according to one inventive concept.

FIG. 8E is a high-resolution TEM image of a sintered aerogel, according to one inventive concept. Inset is an electron diffraction pattern recorded from the junction area in the dashed circle.

DETAILED DESCRIPTION

Figure 1:
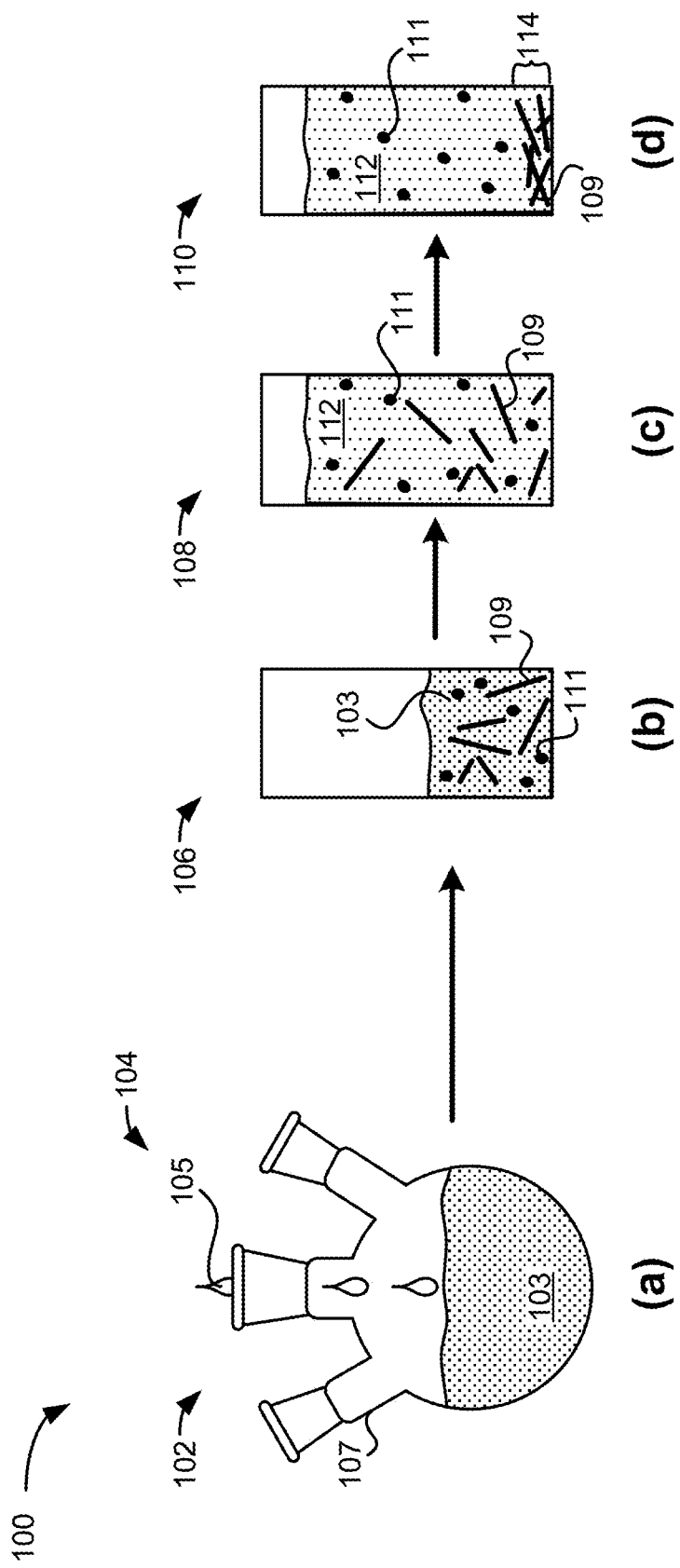
FIG. 1 is a schematic drawing of a method to synthesize purified AgNWs, according to various inventive concepts.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In accordance with one general aspect of the presently disclosed inventive concepts, a metal aerogel includes a plurality of metal nanowires formed into a porous three-dimensional structure, where pores in the structure are anisotropic.

In accordance with another general aspect of the presently disclosed inventive concepts, a method of forming an aerogel of metal nanowires includes suspending a plurality of purified metal nanowires having a polymer coating in an aqueous solution thereby creating a suspension, freeze casting the suspension, lyophilizing the frozen suspension to a dry structure of metal nanowires, and sintering the lyophilized structure of metal nanowires.

The inventive concepts described herein provide an improvement to fabricating metal aerogels with ultra-low predefined density, high electrical conductivity, and mechanical strength in terms of elastic stiffness.

A list of acronyms used in the description is provided below.
3D Three dimensional
$AgNO_3$ Silver nitrate
AgNW Silver nanowire
C Celsius
$CuCl_2$ Copper chloride
CuNW Copper nanowire
EG Ethylene glycol
FT-IR Fourier transform infrared
g grams
mg milligram
ml milliliters
NW Nanowire
Pa Pascals
PVP Polyvinylpyrrolidone
SEM Scanning electron micrograph
TEM Transmission electron micrograph
μm micron, micrometer
XRD X-ray powder diffraction According to various inventive concepts described herein, ultralight metallic NW aerogels may be fabricated with predicable densities, pore structures, electrical conductivity and mechanical properties. In preferred inventive concepts, a freeze-cast method is used to freeze a precise volume of solvent, using a known/predictable amount of nanowires, enabling precise control of the product density.

According to various inventive concepts, a metal aerogel includes a plurality of metal nanowires in a porous three-dimensional structure, where the pores in the structure are anisotropic. An anisotropic pore structure is defined as a structure having pores aligned directionally along an axis. In some approaches, the axis may be aligned longitudinally along the longest length of the structure. In other approaches, the axis of the anisotropic pore structure may be aligned perpendicular to the longitudinal axis aligned along the longest length of the structure.

In various approaches, the metal aerogel may be a metal foam. In various approaches, the plurality of metal nanowires may be formed from illustrative metals such as silver (Ag), gold (Au), copper (Cu), and nickel (Ni). Moreover, the metallic NW aerogels may include more than one type of metal NW (for example, but not limited to, CuNWs and NiNWs).

While much of the following description refers to an inventive concept having silver as the primary component, this has been done by way of nonlimiting example only. Various approaches are described employing other metals with similar characteristics as those described herein.

Moreover, the described methods may produce high-performance Ag foams with an ultra-low density down to at least 4.8 mg/cm$^3$ and a high electrical conductivity up to 51,000 S/m or more. Moreover, the metal aerogel may have a characteristic of mechanical strength, for example, as measured in elastic stiffening. In one approach, a Ag aerogel may have a mechanical strength of a Young's modulus up to about 16,800 pascals (Pa).

FIG. 1 shows a method 100 for forming a plurality of purified silver nanowires (AgNWs), in accordance with one inventive concept. As an option, the present method 100 may be implemented to construct structures such as those shown in the other FIGS. described herein. Of course, however, this method 100 and others presented herein may be used to form structures which may or may not be related to the illustrative embodiments listed herein. Further, the methods presented herein may be carried out in any desired environment. Moreover, more or less steps than those shown in FIG. 1 may be included in method 100, according to various inventive concepts. It should also be noted that any of the aforementioned features may be used in any of the inventive concepts described in accordance with the various methods.

AgNWs may be formed using a modified polyol process as shown in the schematic drawing of the method in FIG. 1. The forming of purified silver nanowires begins with operation 102 as illustrated in part (a) of FIG. 1, and includes heating a mixture 103 of ethylene glycol (EG), polyvinylpyrrolidone (PVP), silver nitrite (AgNO$_3$), and copper chloride (CuCl$_2$). The mixture 103 may be added to a mixing vessel 107 (e.g. flask, round-bottomed flask, beaker, etc.). The mixture solution 103 may be heated in an oil bath. The duration of time for the heating may be about one hour.

Operation 104 of method 100 includes adding AgNO$_3$ 105, preferably freshly prepared in ethylene glycol, for forming silver nanowires (AgNWs). In preferred approaches, the AgNO$_3$ 105 may be added dropwise to the mixture 103 with vigorous stirring.

The growth of Ag NWs may be controlled by addition of AgNO$_3$. The reaction resulting in the growth of AgNWs may finish following a duration of time after the last addition of AgNO$_3$. For example, following a final addition of AgNO$_3$, the reaction mixture is allowed to further react for a duration of time that may be 30 minutes to several hours. When the free Ag ions in the solution are consumed, the reaction may be finished.

When the reaction is finished, operation 106 includes cooling the mixture 103 with added AgNO$_3$ 105, as illustrated in part (b) of FIG. 1.

Figures 2A, 2B, 2C:
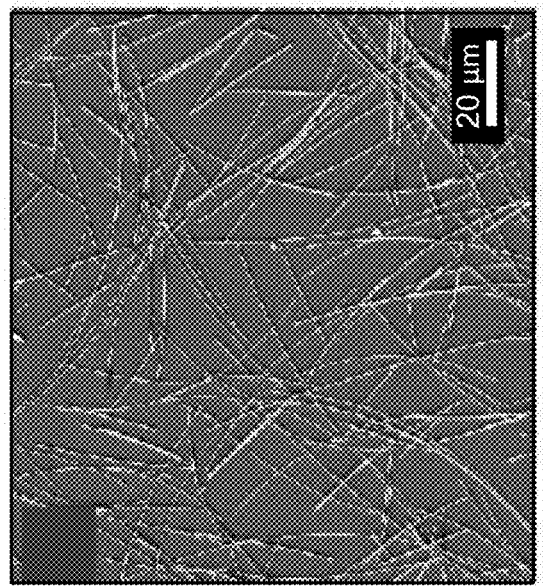
FIG. 2A is a digital photograph of AgNW suspension in ethylene glycol.
FIG. 2B is a scanning electron micrograph (SEM) image of unpurified AgNWs, according to one inventive concept.
FIG. 2C is a SEM image of purified AgNWs, according to one inventive concept.

The suspension may appear to be shiny, silky white as shown in the digital photograph of AgNW suspension in EG in FIG. 2A. Looking back to part (b) of FIG. 1, the newly formed AgNWs 109 are present in the suspension with Ag nanoparticles (AgNPs) 111 in the mixture solution 103. As shown in scanning electron microscope (SEM) image of FIG. 2B (scale bar represents 20 µm), the AgNWs may have a uniform diameter of about 50-100 nm, a typical length of about 40-80 µm, and may be accompanied with a large amount of AgNPs as the main by-product. NPs may be commonly seen in the polyol synthesis method of NWs due to the generation of different seed types and thus the crystal growth in multiple pathways. However, AgNPs may contribute negatively to metal aerogel performance, as the particles may not allow percolation while adding significant weight to the structure. Thus, it would be desirable to purify the AgNWs by removing the AgNPs.

Looking back to part (c) of FIG. 1, operation 108 includes precipitating the AgNWs 109 in solvent 112. In some approaches, the AgNPs 111 may be removed by selective precipitation of the AgNWs 109 in solvent 112, for example, acetone.

As illustrated in part (d) of FIG. 1, operation 110 includes rinsing the AgNWs. In some approaches, operation 110 may include repeated rinsing of a pellet 114 of AgNWs 109 with acetone to remove the AgNPs 111 because the AgNPs 111 tend to remain suspended in the supernatant of the solvent 112 wash.

After discarding the supernatant and re-dispersing the pellet 114 of AgNWs 109 in water, the AgNWs 109 may be enriched and purified.

In a preferred inventive concept in which purified NWs are fabricated from the method 100 as shown in FIG. 1, a metal aerogel may be essentially free of metal nanoparticles. In some approaches, a metal aerogel may include at least 98 wt % purified nanowires. In some approaches a metal aerogel may include nearly zero wt % nanoparticles (less than 0.5 wt %).

As shown in the SEM image of purified AgNWs in FIG. 2C, the selective precipitation procedure with acetone may effectively remove NPs to generate almost 100% pure NW morphologies.

In addition, transmission electron micrograph (TEM) images (FIGS. 2D-2F) together with electron diffraction pattern (see Experimental Methods section, FIG. 7F) show AgNWs have a penta-twinned crystal structure and grow along [011] direction. A representative low-resolution TEM image of AgNWs is shown in FIG. 2D (scale bar is 1 µm). A zoom-in TEM image of the NW end is shown in FIG. 2E (scale bar is 100 nm). The inset of FIG. 2E is an electron diffraction pattern collected from the same NW. These results suggest Ag NWs are enclosed by five {100} side facets and ten {111} end facets.

Figure 2F:
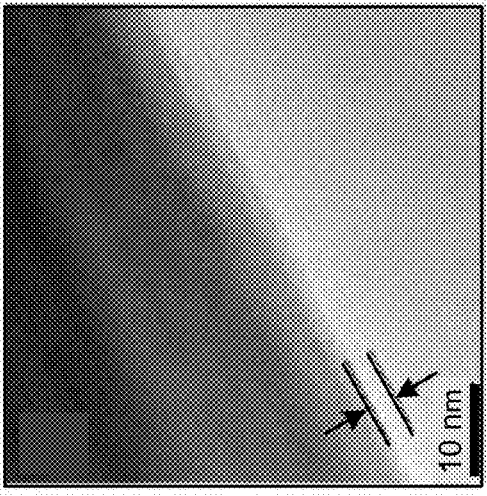
FIG. 2F is a high resolution TEM image of the NW surface.
Figure 2E:
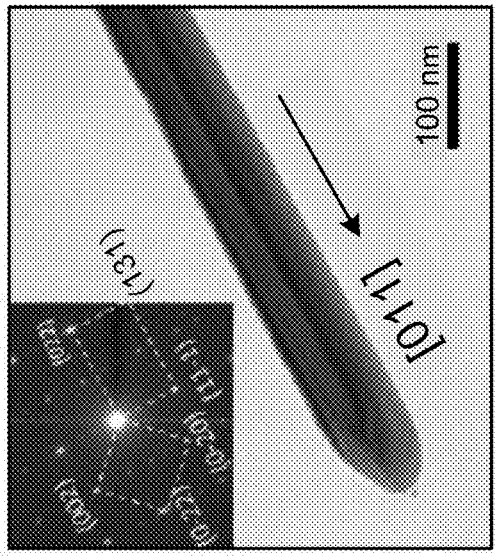
FIG. 2E is a zoom-in TEM image of the NW end with an inset of electron diffraction pattern collected from the same NW, according to one inventive concept.
Figure 2D:
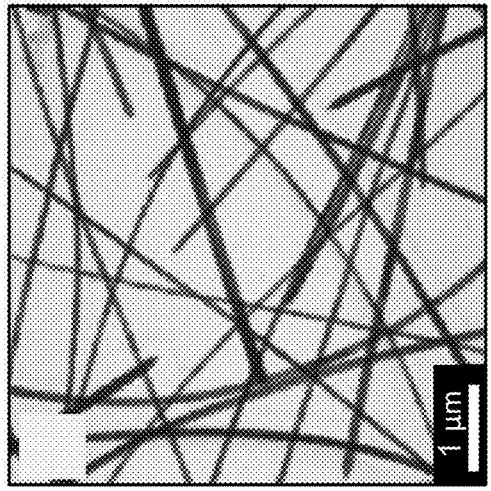
FIG. 2D is a low-resolution transmission electron micrograph (TEM) image of AgNWs, according to one inventive concept.

As shown in FIG. 2F (scale bar is 10 nm), a high-resolution TEM image of the NW surface shows the surface capped by a few nm thin layer of PVP. A PVP coating may help protect the AgNW surface from oxidation and enable efficient NW dispersion in water. Moreover, a PVP coating may prevent NWs from direct contact and may yield high electrical resistivity.

Figure 3:
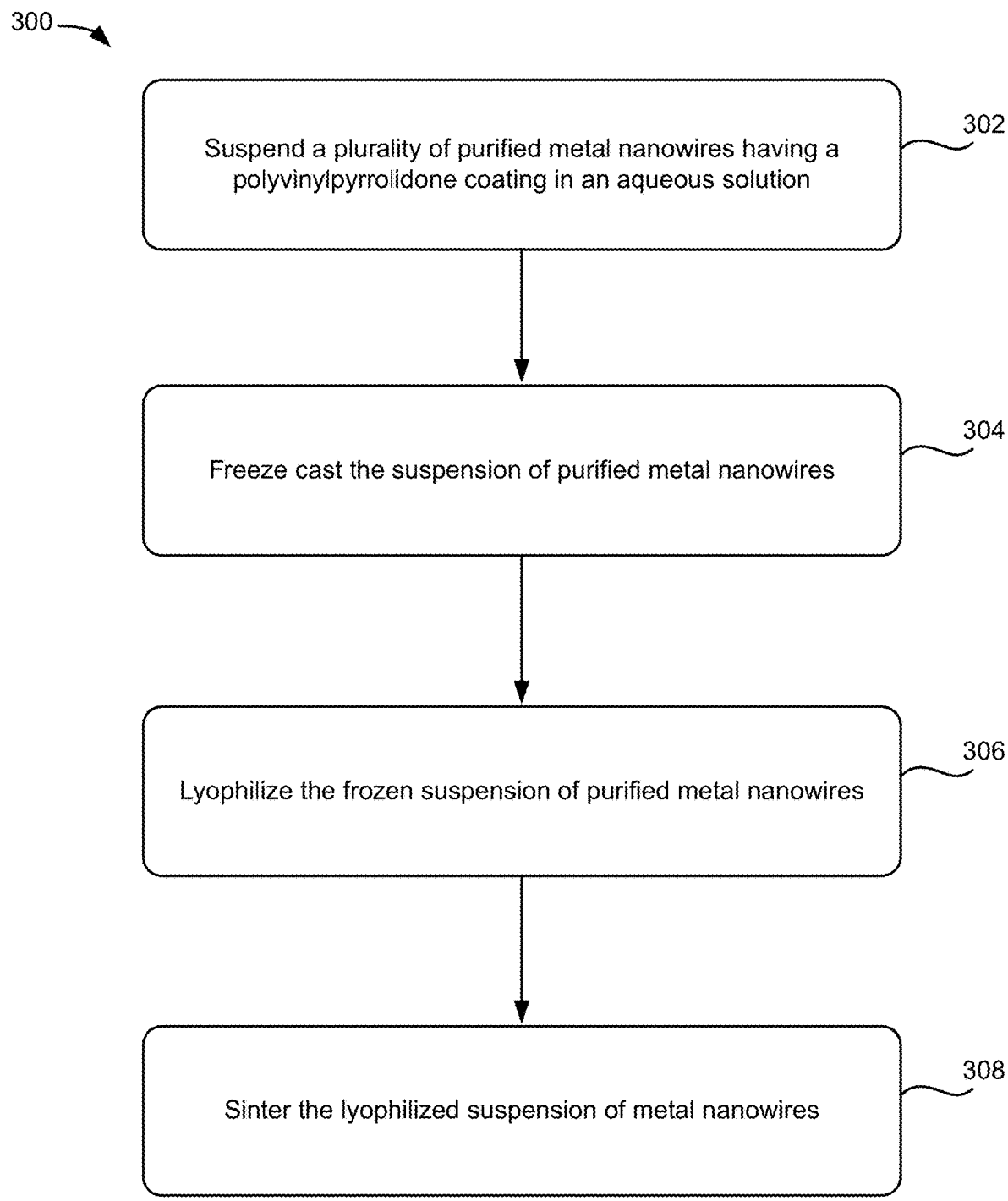
FIG. 3 is a flow chart of a method of forming an AgNW aerogel, according various inventive concepts.

FIG. 3 shows a method 300 for forming an aerogel of metal nanowires, in accordance with one inventive concept. As an option, the present method 300 may be implemented to construct structures such as those shown in the other FIGS. described herein. Of course, however, this method 300 and others presented herein may be used to form structures which may or may not be related to the illustrative inventive concepts listed herein. Further, the methods presented herein may be carried out in any desired environment. Moreover, more or less steps than those shown in FIG. 3 may be included in method 300, according to various inventive concepts. It should also be noted that any of the aforementioned features may be used in any of the inventive concepts described in accordance with the various methods.

According to one inventive concept, a method 300 for forming an aerogel of metal nanowires begins with step 302 that includes suspending a plurality of purified metal nanowires in an aqueous solution thereby creating a suspension. In some approaches, the aqueous solution may be water. In some approaches, the plurality of purified metal nanowires may be a plurality of purified AgNWs. The plurality of purified metal nanowires may have a polymer coating in order to prevent agglomeration of the metal NWs. In some approaches, the polymer coating may be PVP, polyethylene glycol (PEG), polyethylene imine (PEI), poly(vinyl amine) (PV Am), poly(acrylamide), etc. In preferred approaches, the polymer coating on the purified metal nanowires is PVP.

In some approaches, purified AgNWs may be obtained commercially. In other approaches, in order to select and tune aerogel density, a method as described in FIG. 1, method 100, may be preferable so that purified AgNWs with known NW concentration and NW morphology may be synthesized.

In some approaches, the concentration of the suspension of the plurality of purified metal nanowires in an aqueous solution may be in the range of about 2 mg/cc to about 50 mg/cc, but the concentration could be higher or lower depending on the desired aerogel to be formed. In some approaches, the AgNWs remain in suspension by mixing by vortex, mechanical mixing, etc. immediately before step 304.

In some approaches, after suspending the plurality of purified metal nanowires, step 302 includes forming a shape of the plurality of purified metal nanowires. The suspension of AgNWs may be poured into a mold, cast, die, etc. As shown in FIG. 6C, a cylinder shaped lyophilized aerogel structure with a 4-mm diameter and 25 mm length in a glass vial may be formed prior to the freeze casting step 304 by pouring the suspension of AgNWs into a cylinder mold. In other approaches, a variety of other geometries in various dimensions may be formed, for example, discs, spheres, hemispheres, etc. depending on the molds used. In some approaches, an AgNW aerogel shapes (e.g. spheres) may be formed using different methods, for example, a polydimethylsiloxane (PDMS) mold, a plastic mold, emulsion in solvents such as butyl alcohol (BtOH), etc.

Figure 4A:
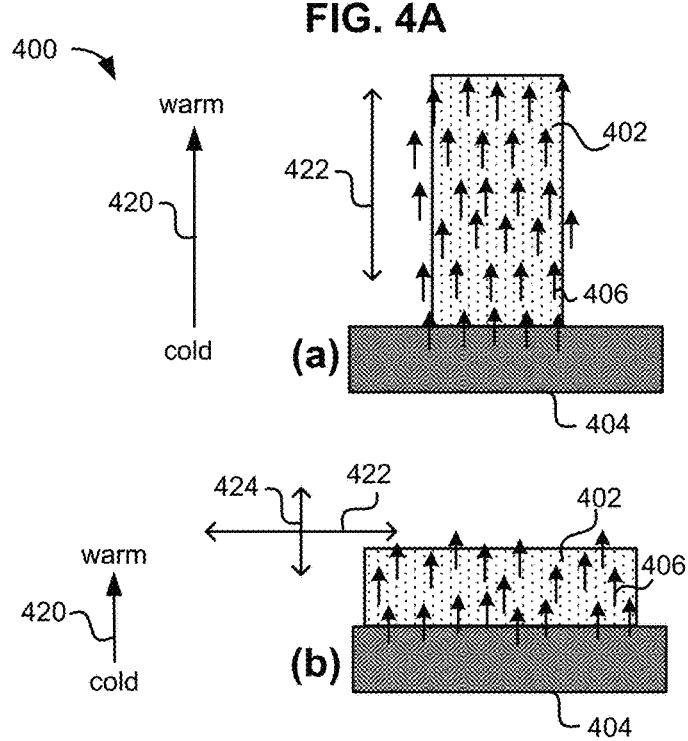
FIG. 4A is a schematic drawing of freeze casting.

Step 304 includes freeze casting the suspension. In some approaches, the freeze casting is directional freeze casting of the suspension. As illustrated in FIG. 4A, a schematic diagram of directional freeze casting 400 includes a sample 402 of a shape of metal NWs from the suspension of step 302 may be immediately placed on a pre-cooled stage 404 in freezing conditions, e.g. liquid $N_2$ (−196° C.), dry ice (−78° C.), etc. In preferred approaches, the pre-cooled stage 404 is metal. In some approaches, cooling time may depend on the liquid volume of metal NW suspension as well as the method of freeze casting.

According to inventive concepts described herein, freeze casting 400 includes directional freeze casting using a directional temperature gradient in a first direction. As illustrated in the schematic drawing of part (a) of FIG. 4A, in some approaches, directional freeze casting 400 of a sample 402 may include a directional temperature gradient from the pre-cooled stage 404 in a vertical temperature gradient 420 along a longitudinal axis 422 of the sample 402. In other approaches as illustrated in part (b) of FIG. 4A, directional freeze casting 400 of a sample 402 may include directional temperature gradient from the pre-schooled stage 404 in a vertical direction along a direction 424 perpendicular to the longitudinal axis 422 of the sample 402.

Figure 4B:
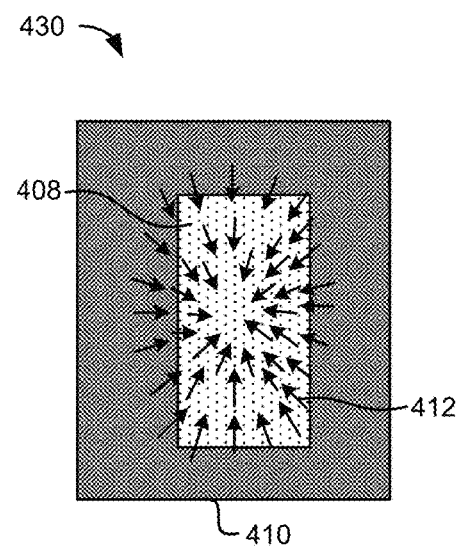
FIG. 4B is a schematic drawing of typical freezing.

The schematic drawing of directional freeze casting 400 as shown in FIG. 4A, part (a) and part (b), can be compared to a schematic drawing of typical random isotropic freezing as shown in FIG. 4B. As shown in parts (a) and (b) of FIG. 4A, due to the vertical temperature gradient 420 in directional freeze casting 400, ice crystals 406 nucleate at the bottom and grow along upwards. In some inventive concepts, in step 304, as ice crystals grow, metal NWs may be redistributed accordingly into well-aligned ice lamella. Directional freeze casting allows growth of ice crystals 406 from the bottom to the top with uniform and anisotropic pore structures.

In some inventive concepts, the structure of the aerogels and pores may be tuned by directional freeze casting of the suspension of metal NWs. Looking to part (a) of FIG. 4A, in some approaches, the sample 402 of a suspension of metal NWs may be directionally freeze cast using a vertical temperature gradient 420 (e.g. the up and down, vertical direction). In other approaches, as shown in part (b) of FIG. 4A, the sample 402 of the suspension of metal NWs may rotated 90° such that the longitudinal axis 422 of the sample 402 is parallel to the surface of the stage 404, then the sample 402 may be freeze cast in a direction 424 perpendicular to the longitudinal axis 422 of the sample 402. In some approaches, there may be different layers within the sample freeze cast, thereby allowing a better control of freezing fronts.

In typical random freezing methods (i.e. isotropic freezing 430) as shown in FIG. 4B, the freezing occurs in an isotropic manner with a cold liquid 410 surrounding sample 408 of suspended NWs such that the freezing of the material occurs with ice crystals 412 forming from the outside of all sides of the sample 408 to the inside of the sample 408.

Figure 4C:
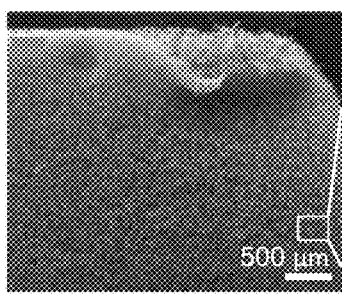
FIG. 4C is an SEM image of AgNW aerogel (scale bar is 500 μm) prepared by freeze casting, according to one inventive concept.
Figure 4D:
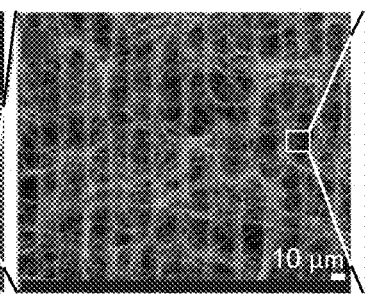
FIG. 4D is an SEM image of AgNW aerogel (scale bar is 10 μm) prepared by freeze casting, according to one inventive concept.
Figure 4E:
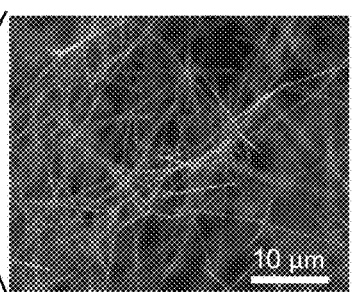
FIG. 4E is a high magnification SEM image of AgNW aerogel (scale bar is 10 μm) prepared by freeze casting, according to one inventive concept.
Figure 4F:
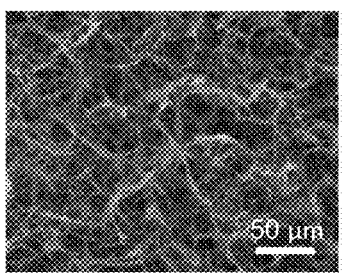
FIG. 4F is an SEM image of AgNW aerogel (scale bar is 50 μm) prepared by typical or "isotropic" freezing, according to one inventive concept.
Figure 4G:
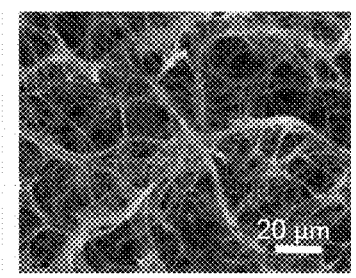
FIG. 4G is an SEM image of AgNW aerogel (scale bar is 20 μm) prepared by typical or "isotropic" freezing, according to one inventive concept.
Figure 4H:
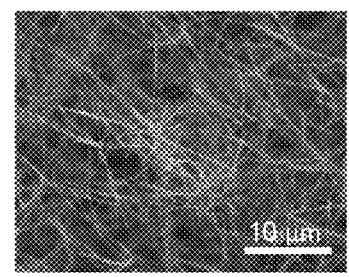
FIG. 4H is a high magnification SEM image of AgNW aerogel (scale bar is 10 μm) prepared by typical or "isotropic" freezing, according to one inventive concept.

As a comparison, FIGS. 4C to 4E show images of AgNW aerogels formed by direction freezing casting 400 and FIGS. 4F to 4H show images of AgNW aerogels formed by random freezing (e.g. isotropic freezing 430). AgNW aerogels formed by direction freeze casting 400 are shown in SEM images at three magnifications, scale bar 500 μm (FIG. 4C), low magnification with scale bar 10 μm (FIG. 4D), and high magnification with scale bar 10 μm (FIG. 4E). The SEM images of the aerogel made by freeze-casting reveal highly anisotropic pore structures, with a pore size having an average diameter in a range of about 25 μm to about 1 μm. In some approaches, a pore size of the metal aerogel may have an average diameter in a range of less than 1000 nm (1 μm) and greater than 500 nm. As shown in the higher magnification image (FIG. 4E), the pores may be defined by a higher density aligned NWs in the perpendicular direction, and filled with low-density interconnected NWs.

In contrast, FIGS. 4F-4H show SEM images of AgNW aerogels formed by random freezing (i.e. isotropic freezing 430) (as shown in schematic drawing of FIG. 4B) in which the NW suspension is submerged into freezing liquid (e.g. $N_2$) and solidification direction converges inwards. FIG. 4F is an SEM image showing distinct spherical pore structures at low magnification (scale bar 50 μm) without any anisotropic pore structure as compared to the pores formed by directional freeze casting in FIG. 4D. A distinct comparison of pores structures formed by the two different freezing techniques are shown comparing FIG. 4D representing directional freeze casting and FIGS. 4F and 4G representing random freezing. The pore size/geometry may be determined by the size/shape of ice crystals which depends on the freezing method. The pore size/geometry of the sample in FIG. 4D has anisotropic pore structure compared to the random pores shown in FIGS. 4F and 4G.

The images of the pore structures at higher magnification (scale bar 10 μm) for each freezing method, direction freezing in FIG. 4E and random freezing in FIG. 4H, show structures that are similar. Without wishing to be bound by any theory, it is believed that the pore size at this level of magnification may depend on the nanowire concentration in the solution during freezing.

Different micropore anisotropies of aerogels may exert impact on the mechanical, electrical and thermal properties of the resulting NW aerogel. Without wishing to be bound by any theory, it is believed that directional freeze casting the metal NWs to form the metal aerogels may help reinforce the mechanical stability and enhance electrical conductivity of the aerogel, yet contributes minimal weight. In contrast to the pores formed during isotropic freezing, the pores formed by freeze casting may be characterized by randomly arranged horizontal nanowires that connect the walls of the pores (see FIG. 4D) and this interconnectedness within the pores may improve the strength of the resulting aerogel structure.

Furthermore, in an exemplary approach, starting in step 302 with a known concentration of purified AgNWs in suspension, the freeze casting step of 304 may allow predictable formation of an aerogel structure of known density relative to the beginning AgNW concentration. In sharp contrast, formation of an aerogel structure from methods that involve settling the NWs from solution followed by isotropic freezing form aerogels of unpredictable density.

Referring back to FIG. 3, step 306 of method 300 includes lyophilizing the frozen suspension to a dry structure of metal NWs. In some approaches, the lyophilizing process, as would be understood by one skilled in the art, may involve drying the frozen sample of step 304 by a dehydration process. Upon removal of the frozen liquid component, the sample transforms into a highly-porous percolated network of nanowires, with NW junctions being weakly connected by the Van der Waals force. In various approaches, conventional methods known by one skilled in the art may be used to lyophilize the frozen AgNW suspension.

Step 308 of method 300 involves sintering the lyophilized structure of metal NWs to burn out the surface layer of PVP on the NWs and to weld the NW junctions. In some approaches, the lyophilized structure of metal NW aerogels may be sintered following methods generally understood by one skilled in the art. In some approaches, sintering may be done in an inert gas, e.g. $H_2$, $N_2$, Ar, etc. In an exemplary approach sintering may be done in $H_2$ gas at in a range of temperature of about 100° C. to about 300° C., preferably about 250° C.

In some approaches, a duration of sintering may be in a range of about thirty minutes to about two hours. In preferred approaches, a duration of sintering may be for about one hour.

In various approaches, after sintering, the aerogel of metal nanowires may be essentially free of polyvinylpyrrolidone (PVP). In some approaches, the aerogel of metal nanowires may include nearly 0 wt % PVP.

Figure 5:
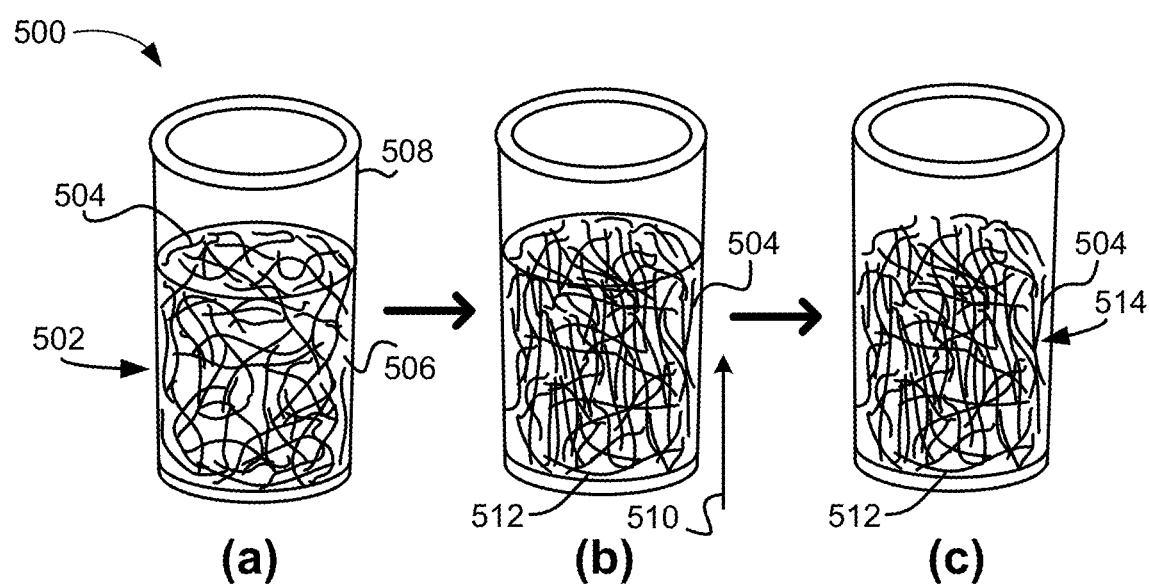
FIG. 5 is a schematic drawing of a method of forming a metal NW aerogel, according to various inventive concepts.

FIG. 5 graphically depicts steps in a method 500 of forming a metal aerogel, according to one inventive concept. Part (a) of FIG. 5 shows a suspension 502 purified metal NWs 504 in an aqueous solution 506. The shape of the metal aerogel may be formed by the vessel 508 that contains the suspension 502 of metal NWs 504. As shown in part (a), a vessel 508 in the shape of a cylinder will form a cylindrical aerogel.

Part (b) of FIG. 5 illustrates the freeze casting of the purified metal NWs 504 of the method 500 (as described in step 304 of FIG. 3). Directional freezing of the suspension 502 along a gradient in a vertical direction 510. Freeze casting the suspension may allow a higher density aligned NWs 504 in the vertical direction, and filled with low-density interconnected NWs 512 in a horizontal direction perpendicular to the NWs 504 in the vertical direction.

Part (c) of FIG. 5 illustrates a lyophilized structure 514 of the purified NWs 504, 512 in the shape of the original vessel 508. The aqueous solution 506 that was frozen in part (b) has been removed by lyophilization of the frozen suspension of purified NWs. The following step (not shown) includes sintering the lyophilized structure to weld the NW junctions (the cross-over point of two NWs) and to remove the PVP from the surface of the purified NWs. Moreover, in some approaches, the lyophilized structure 514 may be removed from the vessel 508 before sintering. The structure of the sintered metal aerogel may have a similar size in relative proportion to the lyophilized structure 514 of part (c).

FIG. 6A depicts a schematic drawing of a metal aerogel 600, in accordance with one embodiment. As an option, the present metal aerogel 600 may be implemented in conjunction with features from any other embodiment listed herein, such as those described with reference to the other FIGS. Of course, however, such a metal aerogel 600 and others presented herein may be used in various applications and/or in permutations which may or may not be specifically described in the illustrative embodiments listed herein. Further, the metal aerogel 600 presented herein may be used in any desired environment.

According to one embodiment, a metal aerogel includes a plurality of metal nanowires formed into a porous three-dimensional (3D) structure where the pores in the structure are anisotropic. As illustrated in the schematic drawing shown FIG. 6A, a metal aerogel 600 of part (a) may be formed of a known concentration of purified metal nanowires 602 into a porous 3D structure 604. In some approaches, the 3D structure 604 may be a structure formed as a cast in a mold, for example but not meant to be limiting in any way, a cylinder as shown. In other approaches, the 3D structure may be molded into shapes (e.g. cube, sphere, etc.).

Part (b) of the metal aerogel 600 illustrates a magnified portion of the 3D structure 604 drawn in part (a). In various inventive concepts described herein, the metal aerogel 600 includes pores 606 in the structure 604 that may be anisotropic. In some approaches, the axes 610 of the pores 606 may be primarily aligned along a longitudinal axis 608 of the 3D structure 604. In other approaches, the axes of the pores may be primarily aligned about perpendicular to a longitudinal axis of the three-dimensional structure (not shown).

In some approaches, the metal aerogel may include a plurality of metal nanowires that includes at least one metal of the following: gold, silver, copper, and/or nickel. In some approaches, the metal aerogel may include more than one type of metal nanowires, e.g. silver nanowires and nickel nanowires. In other approaches, the metal aerogel may include a plurality of metal nanowires of one metal.

In some approaches, the use of purified NW suspension may allow preparation of aerogels of predefined densities. In some approaches, a metal aerogel formed by methods described herein may have a predefined density of at least 4.8 mg/cc. A predefined density may be defined as making a suspension having a defined concentration of purified nanowires as in step 302 (see FIG. 3) to form a metal aerogel having a density relative to the concentration of purified nanowires in the suspension of step 302.

FIG. 6B shows a plot of measured aerogel density vs. NW concentration. Linear curve fitting yields a correlation coefficient of 0.9845, thereby indicating minimal loss of NWs during the aerogel fabrication. By using diluted NW suspensions, low densities, for example, 4.8 mg/cm$^3$ may be achieved. Below density of about 4.8 mg/cm$^3$, aerogels may collapse due to the lack of building block materials to form an interconnected network.

As shown in the digital photograph of FIG. 6C, the metal aerogel may be formed into the shape of a cylinder in a cylindrical vial prior to freeze casting the suspension of metal nanowires.

An SEM image of a metal aerogel microstructure is shown in FIG. 6D. The metal aerogel shown at a magnification where the scale bar is 100 μm shows pores in the structure that are anisotropic being primarily aligned along a vertical direction, according to one inventive concept.

A higher magnification of a metal aerogel microstructure is shown in the SEM image of FIG. 6E, in which the scale is 10× higher (scale bar of 10 μm). In some approaches, the freezing conditions of the sample (e.g. freezing rate) may determine the pore size of the sample. In some approaches, the freezing conditions of the sample may form pore having an average diameter in a range of less than 1000 nm, thereby having an average diameter in the nanoscale range. In other approaches, the freezing conditions of the sample of metal nanowires may form pores having an average diameter ranging from 1000 nm to a few millimeters, thereby having an average diameter in the micron scale, millimeter scale, etc. In an exemplary approach, the metal nanowires of the metal aerogel form a plurality of pores having an average diameter of 25 μm or less.

In some approaches, thermal annealing may not change the aerogel shape or cause any observable shrinkage. In some approaches, thermal annealing may set the structure to be resistant to dissolution in water. In some approaches, thermal annealing may cause significant local change in morphology of NW junctions. Looking to FIG. 8B-8C (see Experimental Methods section), prior to sintering, individual NWs may be distinct throughout the junctions. And after sintering, FIGS. 8D-8E show the welded junctions. Moreover, in the inset of FIG. 8E, a selected area electron diffraction pattern collected from a welded junction shows double diffraction spots along two perpendicular directions which may be ascribed to epitaxial recrystallization.

Thus returning to FIGS. 6F-6H, the junctions of the nanowires (NWs) after sintering may be welded, according to various inventive concepts described herein. The low-resolution TEM images of FIGS. 6F (scale bar is 500 nm) and 6G (scale bar is 100 nm) show the junctions (arrows) of the NWs are welded, while the portions of the NWs away from the junctions are not affected.

Furthermore, in some approaches, sintering the aerogel may remove the PVP coating on the NW surface. As shown in the high-resolution image of the NW surface in FIG. 6H (scale bar is 5 nm), PVP coating has been removed and there is no evidence of silver oxide or silver hydroxide on the NW surface (as compared to a coating present in the purified AgNW in FIG. 2F).

As shown in the images of a metal aerogel in FIGS. 6D-6G, the metal aerogel may be essentially free of nanoparticles, according to various inventive concepts described herein.

In some inventive concepts, metal NW aerogels formed by methods described herein may feature a unique hierarchical porous structure with well-aligned, longitudinal pores. In some approaches, the anisotropic pore structure may be hierarchical having longitudinal pores aligned along a longitudinal axis of the 3D structure. In other approaches, the anisotropic pore structure may be hierarchical having longitudinal pores aligned about perpendicular to a longitudinal axis of the 3D structure. In some approaches, the anisotropic microporous structure may have a pore size in one direction (e.g. the x-y plane) having an average diameter of the pores of tens of microns, while in the z-direction, e.g. perpendicular direction to the x-y plane, the average diameter of the pores may be in the hundreds of microns, or more.

According to some inventive concepts, the metal aerogel includes a plurality of silver nanowires forming a silver aerogel. In some approaches, thermal sintering may effectively remove a polymer coating on the AgNWs (present from the synthesis process of the AgNWs) and may weld the NW junctions.

Metal aerogels formed by methods described herein may have electrical conductivity. Metal aerogels with densities larger than 50 mg/cm$^3$ may have large deviations in electrical conductivity. Without wishing to be bound by any theory, it is believed that large deviations in electrical conductivity might be due to NW segregations in the metal aerogel thereby causing a local inhomogeneity.

Furthermore, AgNW aerogels may have improved electrical conductivity compared to CuNW aerogels formed by similar methods. Without wishing to be bound by any theory, it is believed that enhanced conductivities of the AgNW aerogels may be attributed to junction welding and long aspect-ratio of AgNWs compared to CuNWs.

In some approaches, an electrical conductivity of the metal aerogel, for example AgNW aerogels, may be at least about 35,000 siemens per meter (S/m) and up to 51000 S/m.

From a practical viewpoint, the mechanical properties of a metal aerogel are critical to ensure the structural robustness of the synthesized highly porous metal aerogel, for example, AgNW aerogels. According to various inventions described herein, metal aerogels exhibit a typical mechanical response of highly porous aerogels, e.g. elastic deformation followed by densification at large strains where stress increases dramatically. Furthermore, metal aerogels described herein may fully recover under an applied non-linear strain of about 40%. Without wishing to be bound by any theory, it is believed that the metal aerogels may demonstrate a significant non-linear elasticity by elastic buckling of the metal nanowires within the aerogel networks.

According to inventive concepts described herein, the low relative densities of the metal aerogels may significantly affect a non-linear elastic buckling that may take place during a densification stage, which may result in an elastic recovery of about 50% strain. In this regard, the densification of the metal aerogels may be referred to as an "elastic stiffening" behavior, which may be fundamentally different than the plastic densification in conventional metal foams yet practically encouraging for maintaining the structural robustness upon loading.

In some approaches, a metal aerogel may have tensile elasticity. In some approaches, a metal aerogel may have has a Young's modulus up to about 16,800 pascals (Pa).

Experimental Methods and Instrumentation

All chemicals and solvents were purchased from Sigma-Aldrich (St. Louis, Mo.) and used as received. The scanning electron microscope images were collected in a JEOL-JSM-7401F field emission SEM (Peabody, Mass. 01960). The transmission electron microscope images and diffraction pattern were taken by a FEI Titan 80-300 S TEM (Thermo Fisher Scientific, Fremont, Calif. 94538). XRD was done with a Bruker AXS D8 Advance diffractometer (Madison, Wis. 53711). Diffraction patterns were recorded from 10 to 75° 2θ with a step size of 0.038° at 1.5 second per step. The TGA thermal analysis was performed on a NETZSCH STA 449 F3 Jupiter. FT-IR studies were performed using an ALPHA FTIR Spectrometer (Bruker Inc). The weights of the aerogel samples were measured by a Mettler Toledo® ultra-microbalance (Model# XP2U). The frozen samples were lyophilized in a Labconco benchtop freeze dry system (FreeZone-105 C 4.5-L Cascade system).

Synthesis of Silver Nanowires (100-ml Scale)

For a typical synthesis, ca. 100 ml of ethylene glycol (EG) containing NaCl (0.05 mM), PVP 55K (0.189 mM), AgNO$_3$ (0.0014 mM) and CuCl$_2$ (0.017 mM) was added to a 500-ml round bottom flask and pre-heated at 185° C. in an oil bath. Subsequently, 30 ml of AgNO$_3$ in EG (0.12 M) was added drop-wise to the flask under vigorous stirring. After reaction was done, the flask was removed from the oil bath and cooled down in air to room temperature.

Purification of Silver Nanowires

The AgNWs were purified by sedimentation and selective precipitation of NWs by addition of acetone. First, the as-made AgNW solution in EG was diluted with water to a final volume of 300 ml. This solution was placed overnight for sedimentation. Next, the supernatant was carefully decanted, and water was added back to its original volume of 300 ml, which was settled for another night. After decanting for the second time, 100 ml of water was added to the pallet to make a stock AgNW solution for acetone-based purification.

The AgNW stock solution was then mixed with acetone, vortexed and centrifuged. The pellet was collected, resuspended in aqueous solution containing PVP solution (5 w/v %), and vortexed until the pellet was dissolved. More acetone was added to the pellet and NW were allowed to precipitate. The NW solution was centrifuged, and the process was repeated once more. Then this process was repeated for two more times with PVP solution (2.5 w/v %). This process was repeated until NPs were removed to a satisfying degree. Last, acetone precipitation was repeated once again, but the pellet of AgNWs was resuspended in water. The concentration of the NW aqueous suspension was calibrated by measuring the weight of the dry content in a 1 ml solution using an ultra-microbalance.

Figure 7A:
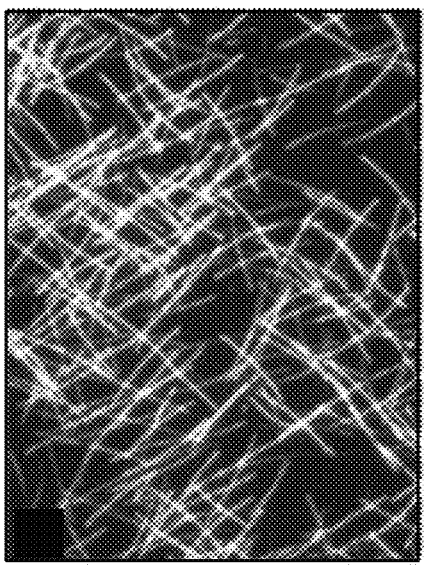
FIG. 7A is an optical image of unpurified AgNWs in an aqueous solution, according to one inventive concept.
Figure 7B:
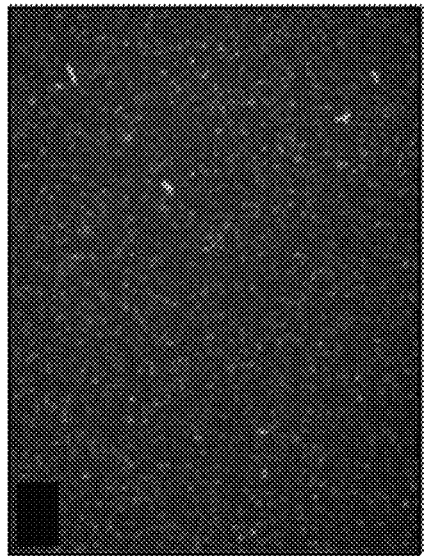
FIG. 7B is an optical image of enriched AgNPs in an acetone/water supernatant, according to one inventive concept.
Figure 7C:
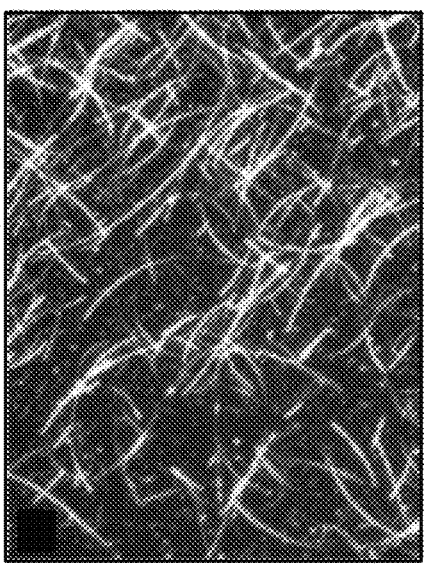
FIG. 7C is an optical image of purified AgNWs, according to one inventive concept.
Figure 7D:
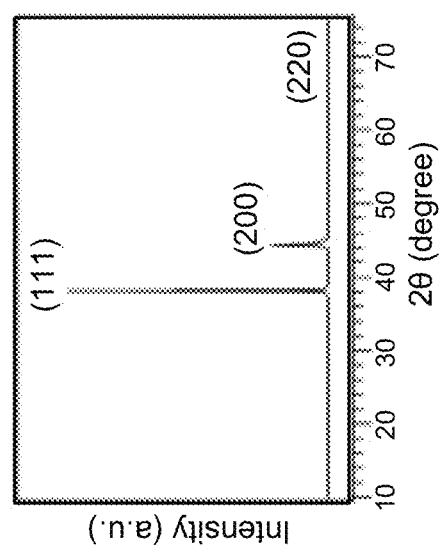
FIG. 7D is a SEM image of unpurified AgNWs, according to one inventive concept.
Figure 7E:
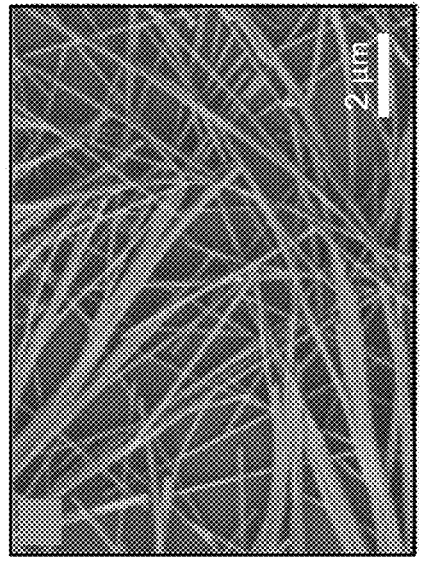
FIG. 7E is a SEM image of purified AgNWs, according to one inventive concept.

FIGS. 7A-7C show the steps of purification of AgNWs. FIG. 7A is an optical image of unpurified AgNWs in an aqueous solution. FIG. 7B is an optical image of enriched AgNPs in the acetone/water supernatant. FIG. 7C is an optical image of purified AgNWs from the settled pellet. FIG. 7D is a SEM image of unpurified AgNWs with AgNPs. FIG. 7E is a SEM image of purified AgNWs. Scale bars on the images represent 2 μm.

XRD Analysis

Figure 7F:
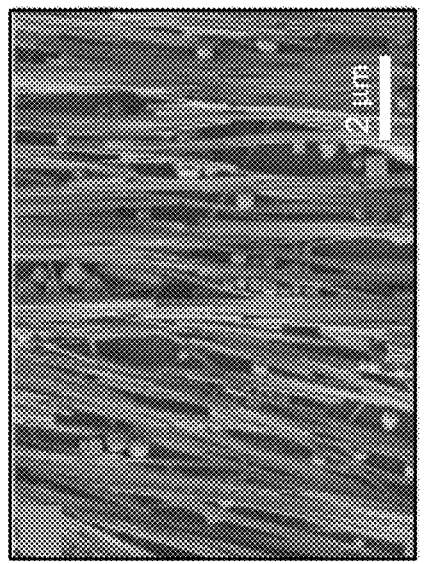
FIG. 7F is a plot of XRD data recorded from purified AgNWs.

The crystal structure of AgNWs may be further characterized by X-ray powder diffraction (XRD) as shown in FIG. 7F and transmission electron microscopy (TEM) as shown in FIGS. 8B-8C. According to the XRD results (FIG. 7F), purified AgNW exhibits two distinct peaks at 2theta=38.1, 44.3, and a small peak at 64.4, corresponding to the {111}, {200} and {220} planes, respectively. The calculated lattice constant from this XRD pattern was 4.086 Å, which is very close to reported value of 4.09 Å of bulk silver (JCPDS card no. 04-0783), indicating the fcc structure of silver.

Formation of AgNW Aerogels

An AgNW suspension with a known NW concentration was vortexed in a glass vial, and then immediately placed on a metal stage pre-cooled in liquid N$_2$. Due to the vertical temperature gradient, ice crystals nucleate at the bottom and grow along upwards. As ice crystals grew, Ag NWs were redistributed accordingly into well-aligned ice lamella.

The frozen NW suspension was then lyophilized using a benchtop Labconco Freeze Dryer (Kansas City, Mo.), leaving behind a highly-porous percolated network of nanowires, with NW junctions being weakly connected by the Van der Waals force.

The AgNW aerogels were then sintered in hydrogen gas (H$_2$) at 250° C. for 1 hour to burn out the surface layer of PVP and to weld the NW junctions.

Thermal Annealing

Aerogels with and without sintering appeared the same in color and morphology, although behaved differently in contact with water. As shown in the digital image of a sintered aerogel and an unsintered aerogel in a petri dish of water (FIG. 8A), the structure of the sintered aerogels maintained integrity, remained intact and floated on water, whereas the structure of the un-sintered aerogel lost integrity and fell apart soon after the addition of water. Without wishing to be bound by any theory, it is believed that the un-sintered aerogel structure dissolved because PVP is soluble in water thereby causing the AgNWs to be susceptible to dissolution.

Low resolution TEM images of un-sintered aerogels are shown in FIGS. 8B and 8C. Low resolution TEM images of sintered aerogels are shown in FIGS. 8D and 8E where the welded junctions following sintering are present, but absent in the un-sintered aerogels (FIGS. 8B-8C). The inset of FIG. 8E shows an electron diffraction pattern recorded from the junction area in the dashed circle.

Fourier Transform Infrared Spectroscopy

Figure 9A:
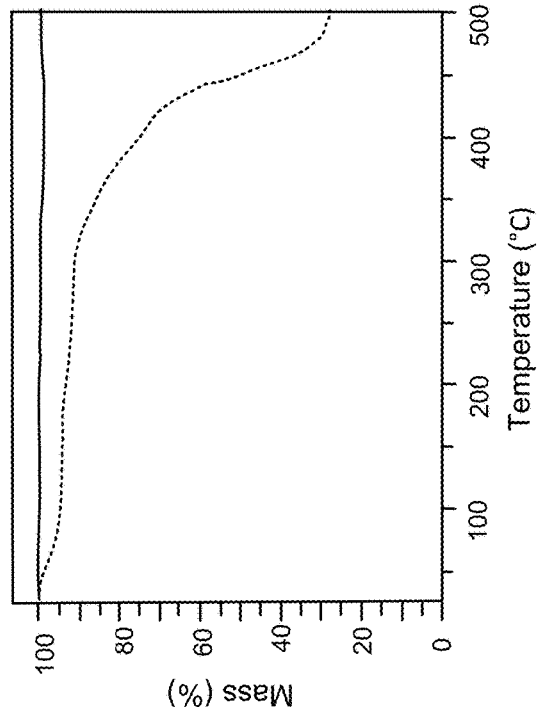
FIG. 9A is FT-IR spectra of PVP, unsintered (as-made) AgNW aerogel, and sintered AgNW aerogel, according to one inventive concept.

As shown in FIG. 9A, the Fourier transform infrared spectroscopy (FT-IR) spectra, pure PVP powder (dotted line) has five characteristic IR peaks at 1290, 1424, 1663, 2953 and 3449 cm$^{-1}$. While these peaks could barely seen in as-made aerogels (dashed line), and the peaks were are absent in sintered aerogels (solid line).

TGA Analysis

The sample was heated up to 650° C. in a silicon carbide furnace at a heating rate of 5K/min, in an open Pt crucible. The heating was conducted under Ar gas flow set at 100 mL/min. A sample weight of at 8 mg was used for PVP while the sample weight of the aerogel was 3-5 mg.

Figure 9B:
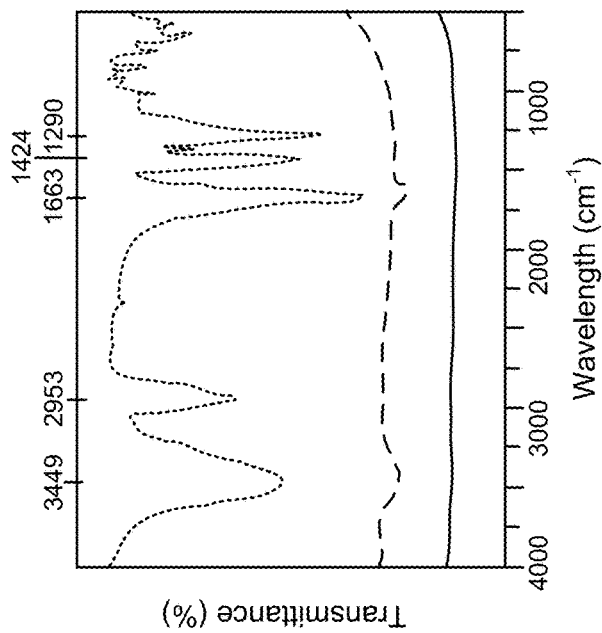
FIG. 9B is TGA analysis of PVP and sintered AgNW aerogel, according to one inventive concept.

As shown in FIG. 9B, TGA analysis reveal that PVP (dotted line) started to decompose slowly above 100° C. and rapidly above 300° C., therefore our thermal treatment at a relatively low temperature (250° C.) is still effect to remove the few-nm-thick PVP coating given enough long time. The sintered aerogel (solid line) showed no change in mass during heating.

Electrical Measurement

The electrical conductivity of aerogels was characterized as a function of density by four-probe measurements, and the analysis of the data leads to several points.

The electrical measurement was carried out using a multi-height probe with RM3000 test unit. Aerogels of different densities were fabricated into disc geometries. The disc has a diameter of 10 mm and a thickness of 0.25 mm. The sheet resistance (Rs) for each sample was measured from multiple sites to obtain an averaged value. The resistivity ($\rho$) is calculated by $\rho$=Rs·thickness. The conductivity is calculated by the following:

$$\sigma = 1/\rho$$

Figure 9C:
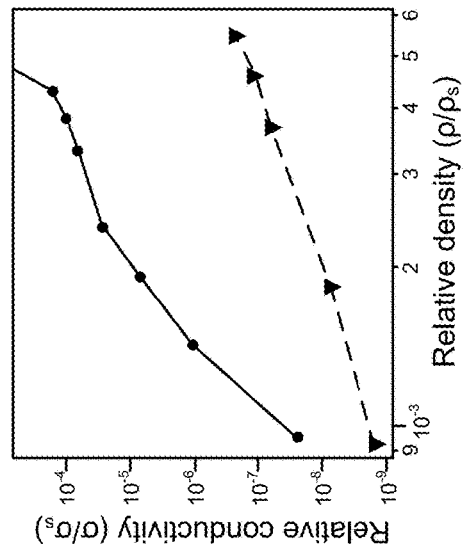
FIG. 9C is a relative conductivity plot as a function of relative density of sintered and unsintered AgNW aerogels, according to one inventive concept.

As shown in the plot of relative conductivity as a function of relative density (FIG. 9C), sintered aerogel samples (solid line, ●) exhibited 2-3 orders of magnitude higher conductivity compared to un-sintered aerogel samples (dashed line, ▼) at similar densities.

At densities larger than 50 mg/cm³, a large deviation of electrical conductivity was obtained, depending the site of measurement.

Figure 10:
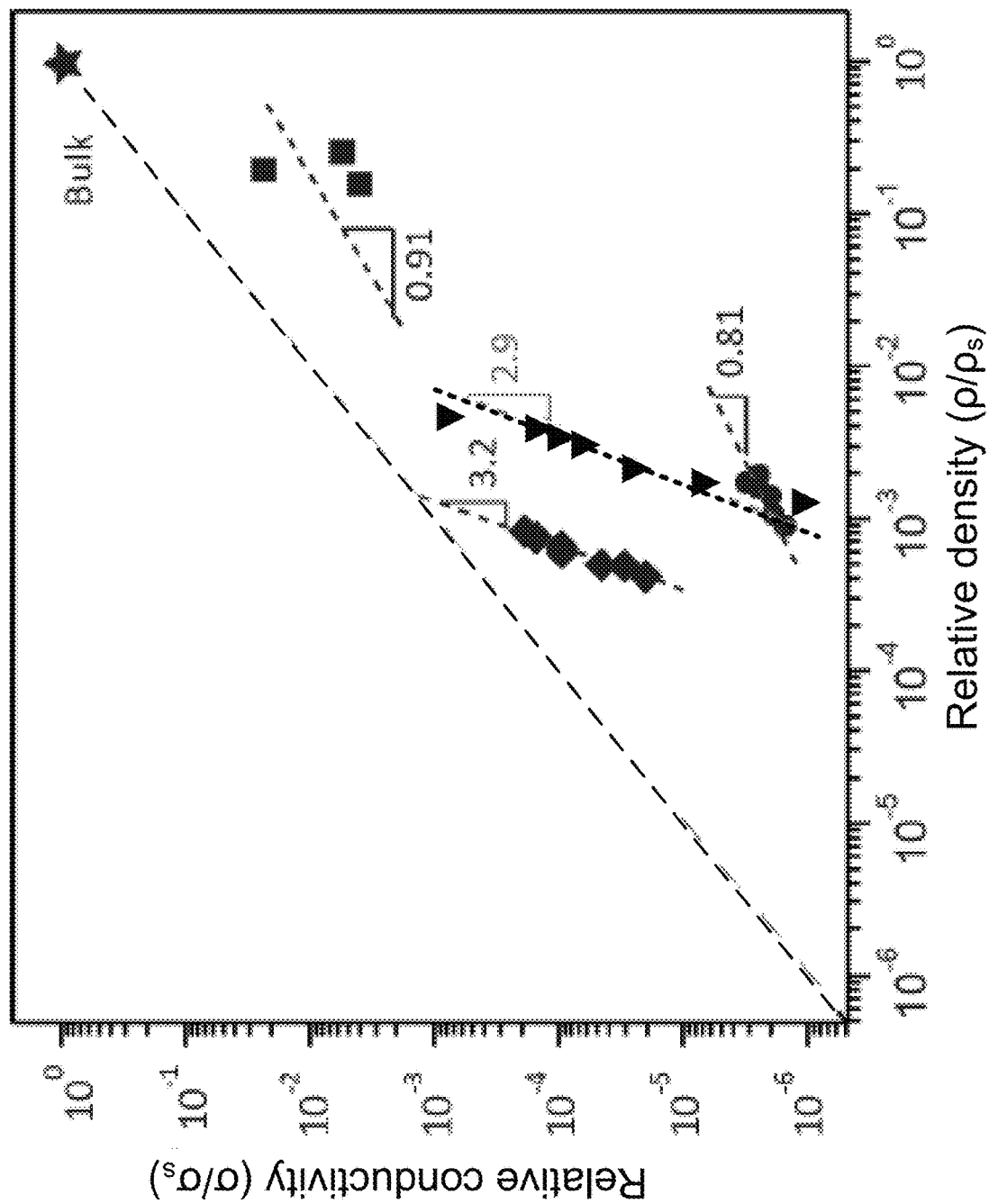
FIG. 10 is a plot of electrical properties of AgNW aerogels prepared by methods described herein compared to aerogels prepared by other methods.

FIG. 10 shows a plot of electrical properties of AgNW aerogels formed by methods described herein compared with aerogels formed by other methods. AgNW aerogels (▼) showed improved electrical conductivity compared to CuNW aerogels (●) prepared by the same freeze-casting method (176 S/m). Based on percolation theory, a power-law scaling of relative conductivity ($\sigma/\sigma_s$) vs. relative density ($\rho/\rho_s$) yielded an exponent of 2.9 (for Ag, $\sigma_s \approx 6.3 \times 10^7$ S/m, and $\rho_s$=10.49 g/cm³). This value was larger than values of Cu foams (■) fabricated by the lost carbonate sintering method (n=0.91) and the CuNW aerogels (●) fabricated by freeze-drying (n=0.81). It has been suggested that formation of a perfectly random percolated network where junction resistance dominate, the scaling exponent would be 1.3 for 2D systems, and 2.0 for 3D systems. The results of the AgNW aerogel (▼) a larger value of n=2.9 was consistent with CuNW aerosponge (♦) (n=3.2), and may be an indication of good conductivity from both individual nanowires and the contacts between them.

However, considering the 3D geometry, structural anisotropy at multiple length scales and the substantially reduced junction resistance of the AgNW aerogels, current models for 2D/3D network may not be sufficient to describe the behavior of the Ag aerogel.

Mechanical Test

Aerogels of different densities were fabricated into cylinders, with a diameter of 10 mm and a height of 5 mm (aspect ratio=0.5). The samples were measured using a universal testing machine (Instron 5943) equipped with a 5 N load cell under a quasi-static strain rate of $5 \times 10^{-4}$ s⁻¹.

Mechanical tests were carried out on the AgNW aerogels. In order to examine the mechanical properties of these AgNW aerogels, uniaxial compression tests were performed of five different AgNW aerogels covering an order of magnitude in relative densities ($\rho/\rho_s$) from $4.6 \times 10^{-4}$ to $4.6 \times 10^{-3}$ under a quasi-static strain rate of $5 \times 10^{-4}$ s⁻¹ (FIGS. 11A-11B).

Figure 11A:
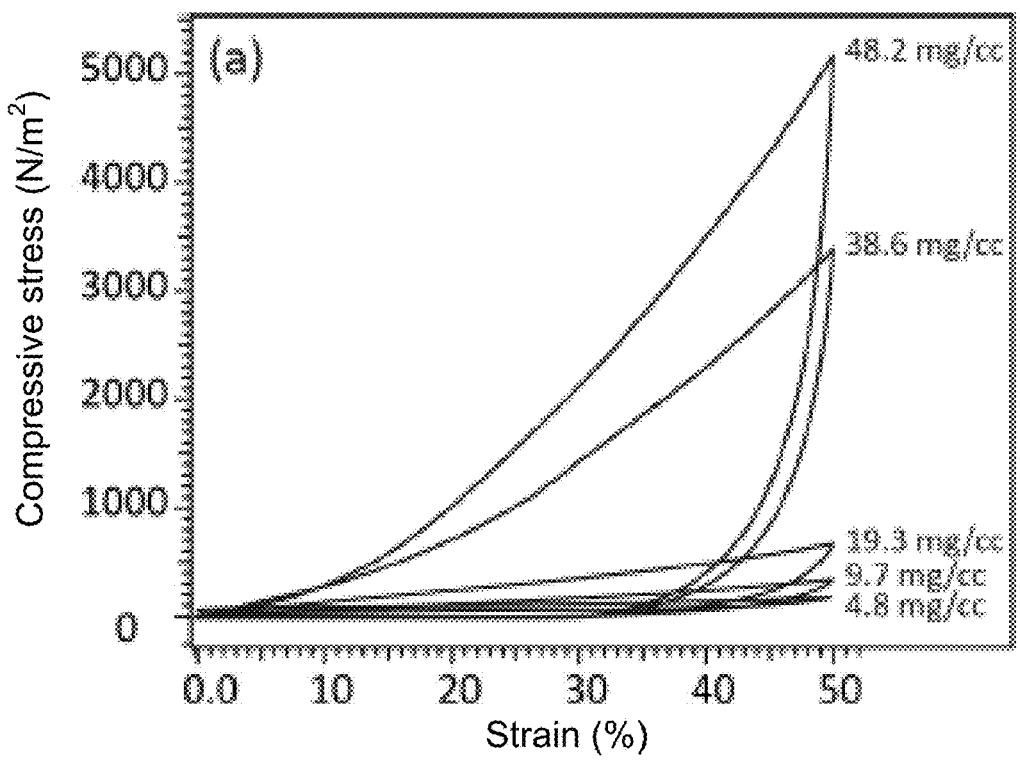
FIG. 11A is plot of compressive stress-strain curves of AgNW aerogels with various densities, according to one inventive concept.
Figure 11B:
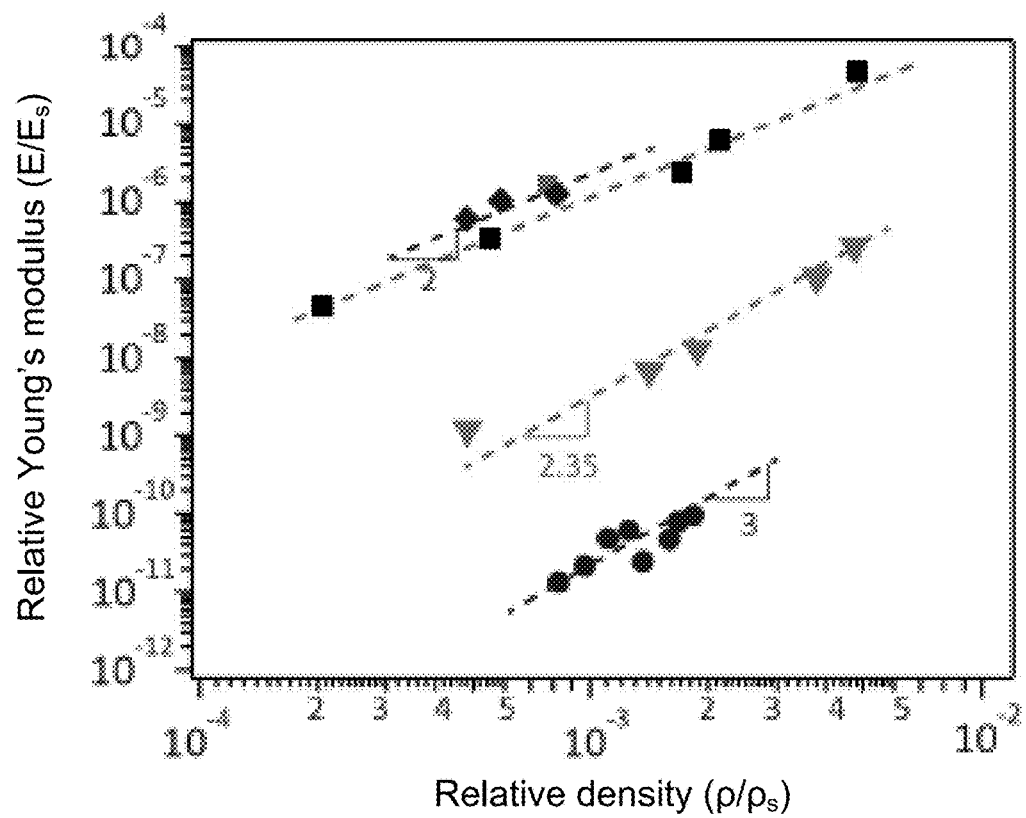
FIG. 11B is a plot of relative Young's modulus as a function of relative density of AgNW aerogels, according to one inventive concept.

As shown in FIG. 11A, all considered AgNW aerogels exhibited a typical mechanical response of highly porous aerogels, e.g. elastic deformation followed by densification at large strains where stress increases dramatically. Furthermore, all considered AgNW aerogels could fully recover under an applied non-linear strain of ~40%, suggesting a significant non-linear elasticity by elastic buckling of the Ag nanowires within the aerogel networks. Based on the classical beam theory, a porous foam architecture can deform by elastic buckling of the constituent beams when the relative density of the foam decreases below a critical value, $$\left(\frac{\rho}{\rho_s}\right)_{crit},$$

which can be determined by the yield strength, $\sigma_y$, and the Young's modulus, $E_s$, of the parent material. For example, $$\left(\frac{\rho}{\rho_s}\right)_{crit} \approx \sqrt[2]{3}\frac{\sigma_y}{E}$$

for a honeycomb-like foam under uniaxial compression. For Ag, $$E_s \approx 70\ GPa \text{ and } \sigma_y \approx 125\ MPa, \left(\frac{\rho}{\rho_s}\right)_{crit} \approx 0.62\%$$

can be approximated.

As summarized in FIG. 11B, the relative Young's modulus ($E/E_s$) of each considered AgNW aerogel was extracted from the slope of the stress-strain curve within the initial linear elastic regime. The $E/E_s$ rapidly increased when the relative density, $\rho/\rho_s$, of the AgNW aerogels (▼) was increased. For example, $E/E_s$ dramatically increased from $1.1 \times 10^{-9}$ to $2.4 \times 10^{-7}$ when $\rho/\rho_s$ was increased from $4.6 \times 10^{-4}$ to $4.6 \times 10^{-3}$.

More interestingly, a quantitative scaling behavior of $E/E_s \sim (\rho/\rho_s)^n$ was revealed, where n≈2.35 was the scaling exponent.

Such a scaling behavior has been reported for a variety of other porous foams. The exponent n of the scaling relationship depends on the specific microarchitecture of the foam. In general, for open foams which deform predominantly through stretching of the constituent beams, n=1, for open foams which deform predominantly through bending of the constituent beams, and n=2 for periodic foams or n=3 for stochastic foams, as represented by the Ni—P microlattices (■) and CuNW aerogels (●) or aerosponges (♦), respectively as shown in FIG. 11B.

Interestingly, for the stochastic AgNW aerogels (▼), it was found n≈2.35, which suggests a bending dominant deformation mechanism. However, such lower scaling exponent than n=3 also indicates a higher connectivity (due to the higher aspect ratio of Ag nanowires) and even some extent of hidden periodicity within our AgNW aerogels, compared with conventional stochastic open foams. Clearly, this lower degrading exponent for the introduced AgNW aerogels than that for conventional stochastic foams or aerogels sets another structural benefit.

In Use

Various inventive concepts described herein may be used electronics, energy storage, catalytic supports, fuel cells, sensing and medical materials.

The high porosity and excellent mechanical/electrical properties of AgNW aerogels as fabricated using methods described herein may lead to new device applications in fuel cells, energy storage, medical materials, catalysis and sensing.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various inventive concepts have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A metal aerogel, comprising:
    a plurality of metal nanowires formed into a porous three-dimensional structure, wherein the metal nanowires have welded junctions at intersections of the metal nanowires,
    wherein pores in the structure are anisotropic.

2. The metal aerogel as recited in claim 1, wherein the metal aerogel is essentially free of nanoparticles.

3. The metal aerogel as recited in claim 1, wherein the metal nanowires are silver nanowires.

4. The metal aerogel as recited in claim 1, wherein the metal aerogel has electrical conductivity.

5. The metal aerogel as recited in claim 1, wherein an electrical conductivity of the metal aerogel is at least about 35,000 siemens per meter (S/m).

6. The metal aerogel as recited in claim 1, wherein the pores are primarily aligned along a longitudinal axis of the three-dimensional structure.

7. The metal aerogel as recited in claim 1, wherein the pores are primarily aligned about perpendicular to a longitudinal axis of the three-dimensional structure.

8. The metal aerogel as recited in claim 1, wherein the pores of the structure have an average diameter in a range of 25 microns to about 1 micron.

9. The metal aerogel as recited in claim 1, wherein the pores of the structure have an average diameter in a range of about 1 micron to about 1000 microns.

10. The metal aerogel as recited in claim 1, wherein the metal aerogel is a metal foam.

11. The metal aerogel as recited in claim 1, wherein a density of the metal aerogel is at least 4.8 milligrams per cubic centimeter (mg/cc).

12. The metal aerogel as recited in claim 1, wherein the metal aerogel has tensile elasticity, wherein the metal aerogel has a Young's modulus up to about 16,800 pascals (Pa).

13. The metal aerogel as recited in claim 1, wherein the plurality of metal nanowires comprises metal nanowires formed from at least one metal selected from the group consisting of gold, silver, copper, and nickel.

14. The metal aerogel as recited in claim 1, wherein the plurality of metal nanowires comprises more than one type of metal nanowires.

15. A method of forming the metal aerogel as recited in claim 1, the method comprising:
    suspending a plurality of purified metal nanowires having a polymer coating in an aqueous solution thereby creating a suspension;
    freeze casting the suspension;
    lyophilizing the frozen suspension to a dry structure of metal nanowires; and
    sintering the lyophilized structure of metal nanowires.

16. A metal aerogel, comprising:
    a plurality of metal nanowires formed into a porous three-dimensional structure,
    wherein the metal nanowires have welded junctions at intersections of the metal nanowires,
    wherein pores in the structure are primarily aligned along a longitudinal axis of the three-dimensional structure.

17. The metal aerogel as recited in claim 16, wherein the metal aerogel is essentially free of nanoparticles.

18. The metal aerogel as recited in claim 16, wherein the metal nanowires are silver nanowires.

19. The metal aerogel as recited in claim 16, wherein an electrical conductivity of the metal aerogel is at least about 35,000 siemens per meter (S/m).

20. The metal aerogel as recited in claim 16, wherein the pores of the structure have an average diameter in a range of 25 microns to about 1 micron.

21. The metal aerogel as recited in claim 16, wherein the pores of the structure have an average diameter in a range of about 1 micron to about 1000 microns.

22. The metal aerogel as recited in claim 16, wherein a density of the metal aerogel is at least 4.8 milligrams per cubic centimeter (mg/cc).

23. The metal aerogel as recited in claim 16, wherein the metal nanowires are essentially free of a polymer coating.

24. The metal aerogel as recited in claim 16, wherein the axis of the pores is aligned along the longest length of the structure.

* * * * *